June 16, 1953  C. H. HAYNES  2,642,304
AUTOMOBILE BUMPER GUARD JACK
Filed Jan. 5, 1949

INVENTOR.
BY Clyde H. Haynes

Patented June 16, 1953

2,642,304

UNITED STATES PATENT OFFICE 2,642,304

AUTOMOBILE BUMPER GUARD JACK

Clyde H. Haynes, Elyria, Ohio

Application January 5, 1949, Serial No. 69,365

2 Claims. (Cl. 293—69)

My invention relates in general to jacks and in particular to an automobile jack which is incorporated in the bumper guard.

Many types of auto jacks have been designed and many of these are engageable with the bumper to lift the car body and a wheel therewith off the ground. These bumper jacks usually have a hook which hooks under the bumper. I have found that most drivers are afraid that in using the ordinary jack the hook will slide along the bumper and let the automobile fall. This is very dangerous when the wheel is off the axle since the axle will hit the ground and be damaged. If this happens it is very difficult to again lift the automobile to put another wheel on the axle.

I have discovered that the bumper jack may be incorporated in the ordinary bumper guard. My new and improved bumper guard jack is fastened securely to the bumper of the automobile body and cannot slip to let the automobile fall. Even with the wheels on ice there is no chance for the jack to let go and slide away from the automobile.

In designing my new and improved bumper guard jack device I have for one of my objects the economical manufacturing of an automobile jack which is safe and which is easy to operate.

Another object is to provide a jack in the bumper guard whereby the operator can stand outside of the automobile when raising the automobile body.

Still another object is to provide a safe and reliable automobile jack which is securely fastened to the automobile while in use.

A further object of my invention is to provide a bumper guard with spaced jack rod engagement portions through which a jack rod may be safely extended to lift an automobile body.

Still a further object of my invention is to provide the bolt which secures a bumper guard to the bumper with a threaded opening adapted to cooperate with a threaded jack rod.

Other objects and a fuller understanding of the invention may be had by referring to the following description and claims, taken in conjunction with the accompanying drawings, in which:

Figure 1:
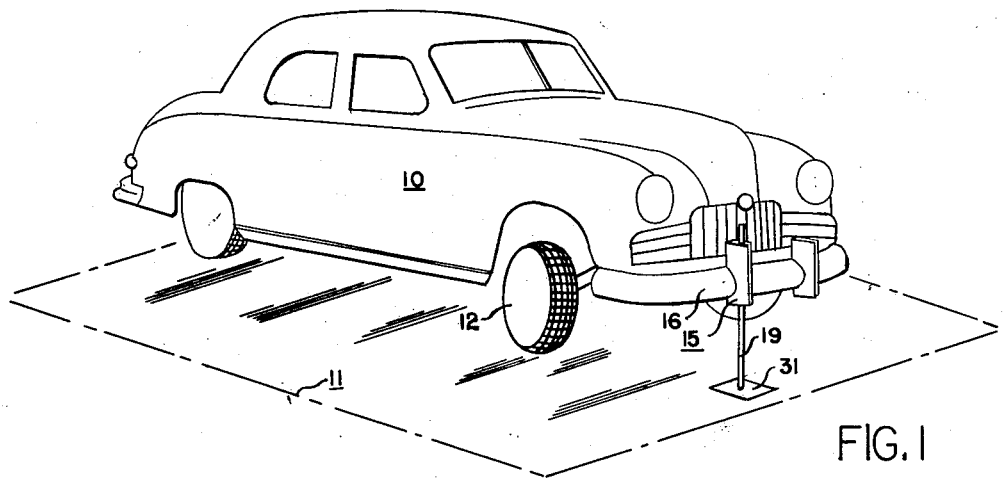
Figure 1 is a plan view of an auto lifted by my bumper guard jack.

My bumper guard jack device is illustrated in Figure 1 holding an automobile body 10 off the ground, represented by dot-dash line 11. The automobile body carries wheels including wheel 12 which is illustrated in Figure 1 in a suspended position off the ground and away from the body. The fenders on present day automobiles extend over the outside of the wheels thus making it necessary to lift the automobile body a great distance from the ground to remove the wheel from the axle. My bumper guard jack device safely and easily lifts the automobile body 10 off the ground a distance sufficient to lift the wheel 12 off the ground. I have identified my bumper guard jack with the reference character 15 and the bumper which supports it by the reference character 16. My bumper guard jack may be fastened to both the front and the rear bumpers of an automobile even though I have illustrated it as being carried by the front bumper 16 of the automobile.

Figure 2:
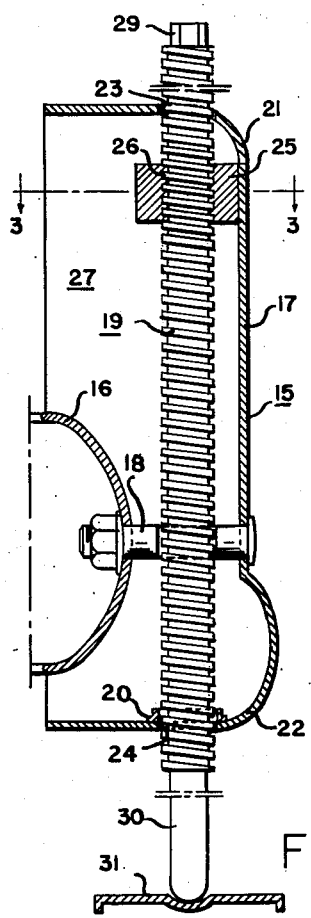
Figure 2 is a cross sectional view of my bumper guard jack.

The bumper guard jack 15 is illustrated in cross section in Figure 2 and includes a bumper guard 17 fastenable to the bumper 16 by a suitable bolt 18. The bumper guard 17 has a top end 21 and a bottom end 22 defining spaced rod guide portions. A threaded jack rod 19 extends through the bumper guard and is threadably mounted therein to lift the automobile body 10 when the threaded jack rod 19 is turned relative to the bumper guard 17. In Figure 1, I illustrate the threaded jack rod 19 as extending through the top and bottom of the bumper guard and also as extending substantially at right angles to the plane of the front bumper 16. The threaded jack rod 19 extends through an opening 24 in the bottom rod guide portion 22 of the bumper guard 17 and also through an opening 23 in the top rod guide portion 21 of the bumper guard 17.

Figure 3:
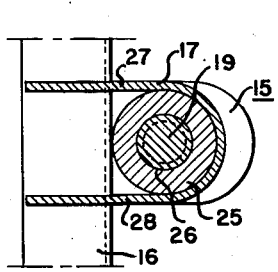
Figure 3 is a cross sectional view taken on line 3—3 of Figure 2.

I have found it advisable to weld or otherwise fasten an internally threaded member 25 to the inside of the bumper guard 17. Although this internally threaded member 25 may be fastened at any position in the bumper guard 17, it is advisable to fasten it to one of the ends or one of the spaced rod guide portions 21 and 22. In Figures 2 and 3 I have illustrated the internally threaded member 25 as being fastened in the bumper guard member at the top end 21 thereof or in the spaced rod guide portion 21, thus integrally making the member 25 a part of the rod guide portion.

The internally threaded member 25 is illustrated in Figures 2 and 3 as being a cylindrical body having a threaded opening 26 therein. Although any suitable design or shape of internally threaded member may be used, the cylindrical member has been found to be the most economical to manufacture and fasten into the guard member. As with most bumper guard members, the front of my guard member is curved and has side walls 27 and 28 extending in planes substantially perpendicular to the bumper and over the bumper 16. By designing the front of the bumper guard member 17 circular to match the outside surface of the internally threaded member 25, I have provided a plurality of points of contact between the bumper guard 17 and the internally threaded member 25. The internally threaded member 25 may be spot welded to the side walls 27 and 28 on opposite sides thereof and also on the front of the bumper guard member to securely fasten it thereto.

The elongated threaded jack rod 19 which extends through the opening 23 and 24 in the bumper guard member 17 is removably threadable through this internally threaded member 25. The openings in the spaced rod guide portions (generally the top and bottom ends of the bumper guard) and the threaded opening 26 must be coaxially aligned to permit the jack rod 19 to be extended therethrough. A bushing 20 may be fastened to the guard member at the openings in the rod guide portions to provide an axially longer bearing surface for the threads on the jack rod 19. With this bushing 20 the threads will not bind in the rod guide portion.

When the jack rod is extended through the bumper guard, as is illustrated in Figure 2, there is no way in which the jack rod 19 and the bumper 16 of the automobile body 10 can become disengaged. The jack rod 19, in extending through the openings in the space rod guide portions of the bumper guard 17, is always fastened to and disposed at an angle to the bumper 16. I have found it advisable to provide a wrench engageable portion 29 on the top end of this threaded jack rod 19 and an extended non-threaded portion 30 on the bottom end of the jack rod 19. This wrench engageable portion 29 is preferably constructed to receive the same wrench as is used to remove the nuts on the wheel 12. Although I provide the jack rod 19 with the wrench engageable portion 29 it is understood that a hole through the jack rod 19 for receiving a bar or a handle or any other suitable means well known in the art may be substituted to provide means for threading the jack rod 19 through the internally threaded member 25 and thereby raise the automobile body 10 off the ground.

The non-threaded portion 30 on the other end of the jack rod 19 is of a length slightly less than the distance between the internally threaded member 25 and the ground when the car has a flat tire. In omitting the threads from this end 30 the operator of the jack does not have to turn the jack rod 19 as many times before the member 30 engages the ground. In Figure 2, I have illustrated in cross section a small plate 31 which may be rested on the ground to provide a better support for the end 30 of the jack rod 19.

Figure 5:
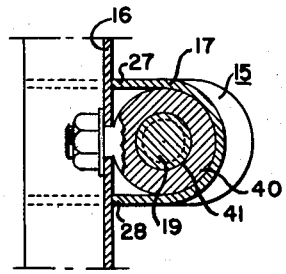
Figure 5 is a cross sectional view on line 5—5 of Figure 4.
Figure 4:
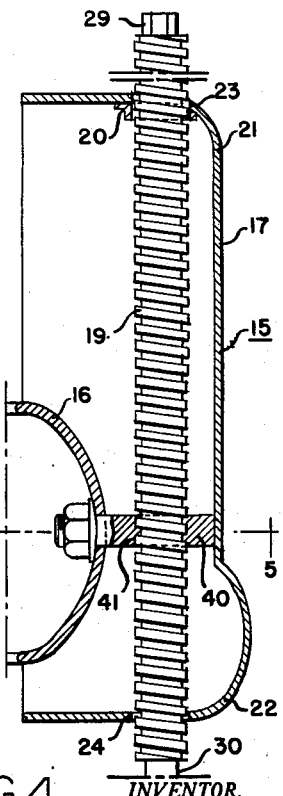
Figure 4 is a cross sectional view of a modification of my bumper guard jack.

In Figures 4 and 5 of my drawings, I have illustrated a modification of my invention in which the bolt used for fastening the bumper guard member 17 on to the bumper 16 is internally threaded. This bolt is designated by the reference character 40 and has an internally threaded opening 41 coaxially aligned with the openings 23 and 24 in the rod guide portions 21 and 22 respectively of the bumper guard 17. A jack rod 19 may thus extend through the rod guide portions 21 and 22 of the bumper guard 17 when it threadably extends through the bolt 40. As with the preferred embodiment of my invention, as illustrated in Figure 2, the modified embodiment of my invention thus provides spaced rod guide portions engageable with the jack rod to keep the jack rod 19 in substantially a vertical position while it is supporting the automobile body 10. This bolt 40 illustrated in Figures 4 and 5 is preferably welded to the walls 27 and 28 of the bumper guard 17 in the same manner as the internally threaded member 25 of Figures 2 and 3.

The elongated threaded jack rod 19 and the ground plate 31 are usually carried in the tool kit or trunk of the automobile. When the driver finds it necessary to jack one of the wheels off of the ground, he removes the threaded jack rod 19 and drops it into the bumper guard closest to the wheel which must be lifted. Turning the threaded jack rod 19 through the threaded means in the bumper guard causes the jack rod to lift the bumper guard 17 and the automobile body 10 therewith off the ground. The spaced rod guide portions of the bumper guard insures the driver that the jack rod 19 will not tip or slide out from under the bumper 16. The jack rod 19 will hold the automobile body 10 up to suspend the wheel 12 off the ground until it is turned backwards to let the automobile down.

I have found that each of the bumper guards may be equipped with the openings in the top and bottom ends thereof and with an internally threaded means for only a few cents cost. Only one threaded jack rod is needed for an automobile since this jack rod may be threaded through any of the bumper guards on the automobile. My bumper guard jack device thus provides a strong, safe and efficient automobile jack which is included in the bumper guard and which may be operated by any driver without fear of having the jack slide out from under the car.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device permanently securable to a vehicle and adapted to be temporarily used with a long vehicle lifting screw member, said device comprising, a modified channel shaped bumper member permanently securable horizontally to and externally of a vehicle with the bumper member opening towards the vehicle and providing a generally curved outer surface, a guard of modified U-shaped cross-section opening towards the bumper member and permanently secured and attached to said bumper member, said guard having a top portion and a bottom portion provided with openings located beyond the curved outer surface of the bumper member thus providing a vertical passageway externally of the bumper member and internally of the guard whereby a long lifting screw member may be temporarily and removably inserted downwardly into the opening in the top portion and outwardly through the opening in the bottom portion of said guard, at least one of said openings providing screw member guide means, and threaded means secured within and to said guard in alignment with said openings and cooperatively engageable with a vehicle lifting screw member temporarily inserted downwardly through said openings for lifting the vehicle by turning of the screw member, said guard having spaced side walls overlying and secured against said curved outer surface to maintain said guard in vertical alignment relative to said horizontal bumper member thereby maintaining the lifting member in vertical position while the vehicle is temporarily being lifted.

2. The device as defined in claim 1 wherein the threaded means also permanently attaches and secures the guard to the bumper member.

CLYDE H. HAYNES.

References Cited in the file of this patent

UNITED STATES PATENTS

| Number | Name | Date |
|---|---|---|
| 1,702,027 | Beaver | Feb. 12, 1929 |
| 2,054,568 | Beach | Sept. 15, 1936 |
| 2,092,719 | Ryerson | Sept. 7, 1937 |
| 2,149,248 | Haferkorn | Feb. 28, 1939 |
| 2,213,840 | Hoecker | Sept. 3, 1940 |
| 2,456,375 | Cedarholm | Dec. 14, 1948 |